United States Patent
Egner-Walter et al.

[11] Patent Number: 6,101,664
[45] Date of Patent: Aug. 15, 2000

[54] DRIVE DEVICE FOR AT LEAST TWO VEHICLE WINDSCREEN WIPERS

[75] Inventors: Bruno Egner-Walter, Heilbronn; Eckhardt Schmid, Brackenheim, both of Germany

[73] Assignee: ITT Manufacturing Enterprises, Inc., Wilmington, Del.

[21] Appl. No.: 09/051,382

[22] PCT Filed: Jul. 4, 1996

[86] PCT No.: PCT/EP96/02951

§ 371 Date: Jun. 8, 1998

§ 102(e) Date: Jun. 8, 1998

[87] PCT Pub. No.: WO97/16332

PCT Pub. Date: May 9, 1997

[30] Foreign Application Priority Data

Oct. 27, 1995 [DE] Germany .................. 195 39 972

[51] Int. Cl.[7] .................. B60S 1/18; B60S 1/28
[52] U.S. Cl. .................. 15/250.3; 15/250.31; 15/250.27; 74/42; 74/43; 74/51
[58] Field of Search ........... 15/250.3, 250.31, 15/250.14, 250.27; 74/42, 43, 51

[56] References Cited

U.S. PATENT DOCUMENTS

| | | | |
|---|---|---|---|
| 2,861,457 | 11/1958 | Harrison | 74/42 |
| 3,874,249 | 4/1975 | Carpenter | 15/250.27 |
| 5,222,706 | 6/1993 | Hoshino | 15/250.31 |
| 5,261,286 | 11/1993 | Hayashi | 74/51 |
| 5,836,042 | 11/1998 | Funk et al. | 74/42 |

FOREIGN PATENT DOCUMENTS

| | | |
|---|---|---|
| 0306361 | 3/1989 | European Pat. Off. |
| 2667833 | 4/1992 | France . |
| 6900129 | 1/1969 | Germany . |
| 2319840 | 4/1974 | Germany . |
| 2529949 | 8/1976 | Germany . |
| 2256791 | 12/1992 | United Kingdom . |
| 90/09299 | 8/1990 | WIPO . |

*Primary Examiner*—Theresa T. Snider
*Attorney, Agent, or Firm*—J. Gordon Lewis

[57] ABSTRACT

A drive mechanism for at least two windshield wipers of a vehicle, in particular of an automotive vehicle, with a driving motor (1) which includes a gear unit accommodated in a gear casing (2) which is closed by means of a cap and where, on the end of an output shaft (3) protruding from the gear casing (2), a motor crank (4) is fastened in a torsion-resisting manner for driving the wiper shafts (8) of the at least two wiper bearings (5, 11) via rods, is to be improved so that, on the one hand, it is easily adaptable to the space or installation conditions prevailing on the vehicle while, on the other hand, due to a reduced number of components, it can be manufactured at lower cost as compared to known drive mechanisms. This is achieved in that the one wiper bearing (5) is an integral part of the gear casing (2) or of the cap thereof and in that at least one further wiper bearing (11) is fastened on a carrier (12) of selectable length which, on its part, is fastened on the gear casing (2) or on the cap thereof.

16 Claims, 1 Drawing Sheet

DRIVE DEVICE FOR AT LEAST TWO VEHICLE WINDSCREEN WIPERS

BACKGROUND OF THE INVENTION

This invention relates to a drive mechanism for at least two windshield wipers of a vehicle, in particular of an automotive vehicle.

From DE-GM 7103702, a drive mechanism for two windshield wipers is known which includes a driving motor with a gear unit. The gear unit is accommodated in a gear casing which is directly linked to the driving motor and which further is designed so that two wiper bearings are worked into the gear casing and the gear casing also receives the driving rods for the two wiper bearings. The gear casing which is a casting or molded part is entirely closed by a cap so that, on principle, the overall drive mechanism features a completely molded case design. Due to its compact design, the essential advantage of such a drive mechanism is the easy handling when being mounted in a vehicle. On the other hand, the gear casing features a relatively complicated shape so that the costs of its manufacture are relatively high. Moreover, the shape of the gear casing invariably determines the points of support of the wiper shafts or rather the distance between the wiper shafts. Thus, a change in the points of support of the wiper shafts or rather in the geometry of the drive mechanism always implies the manufacture of a gear casing of different shape. This known drive mechanism, thus, cannot easily be adapted to varying geometrical conditions of different vehicles so that this drive mechanism, on principle, can be used for the same vehicle, only.

Another drive mechanism for at least two windshield wipers is known from EP 0 409 944 B1. This drive mechanism also includes a driving motor comprising a gear unit which is accommodated in a gear casing which is a casting or molded part and is closed by a cap. The drive mechanism includes two wiper bearings each of which is linked to respectively the gear casing or the cap of the gear casing via a tubular carrier. Each of the tubular carriers is slipped with its opposite ends onto a pivot connected with the wiper bearing and onto a pivot connected with respectively the gear casing or the gear casing cap and is fixed thereon by means of caulking. The essential advantage of this drive mechanism is that it is adaptable in an extremely flexible manner to very different geometrical conditions of different vehicles. On the one hand, such adaptations to the space conditions in the respective vehicle are made by appropriately selecting the length of the carriers which connect the wiper bearings with respectively the gear casing or the gear casing cap. On the other hand, it is possible to effect a further adaptation by bending the carriers or by changing the angle position of the wiper bearings around the longitudinal axis of the carrier. A disadvantage of this drive mechanism is the relatively big number of individual component parts from which this mechanism is assembled. This relatively big number of individual component parts involves increased assembly efforts for manufacturing this mechanism, a heavier weight of the drive mechanism as well as a larger amount of arrangements as regards the individual component parts.

It now is an object of this invention to improve a drive mechanism for at least two windshield wipers so that, on the one hand, it will be relatively easy to adapt it to the space conditions in different vehicles and, on the other hand, to ensure a low-cost manufactureabilty by reducing the required number of component parts.

SUMMARY OF THE INVENTION

According to this invention, this object is solved by a drive mechanism for at least two windshield wipers providing that one of the wiper bearings is an integral part of respectively the gear casing, which only accommodates the gear unit belonging to the driving motor, or of the cap thereof. In this way, it is possible, by contrast with a known drive mechanism in accordance with EP 0 409 944 B1, to do without the carrier which otherwise connects this one wiper bearing with the driving motor. This reduces material, weight, assembly operations and arrangements. On the other hand, fastening the at least one further wiper bearing on respectively the gear casing or gear casing cap via a carrier ensures the possibility of adapting the drive mechanism to varying space conditions in vehicles, i.e., to varying geometrical conditions. The length of this carrier is freely selectable so that it will thus be possible to determine the distance between the at least two wiper bearings in dependence on the predetermined points of installation of the wiper bearings on the vehicle. Moreover, by means of appropriate bendings of the carrier, there exists the possibility of freely selecting or varying the relative position of the at least one further wiper bearing relative to the one wiper bearing integrally connected with the gear casing or gear casing cap, or rather to the driving motor. It is likewise possible to determine the relative angle position of the wiper shaft of the at least one further wiper bearing by bending the carrier or by selecting an appropriate angle position around the longitudinal axis of the carrier according to conditions.

It is thus evident that a drive mechanism according to the present invention combines the advantages of the drive mechanisms known and described at the beginning.

An advantageous embodiment provides an arrangement of the one wiper bearing as a part of the gear casing or of the cap thereof on the outside of the gear casing. The advantage of this arrangement is that the inside space of the gear casing will only have to be that big and that its geometrical shape can be selected so as to exclusively accommodate the gear unit in the gear casing. There is thus no need for providing specific room for this one wiper bearing within the gear casing.

An advantageous embodiment provides fastening lugs on the gear casing or on the gear casing cap for fastening the drive mechanism on the vehicle. This enables the drive mechanism to be directly fastened to the vehicle without the use of an extra fastening device. In particular, the heaviest part of the drive mechanism, the driving motor will be fastened directly to the vehicle. This arrangement will be of particular advantage if further one fastening lug will directly be molded to the wiper bearing which is part of the gear casing or of the gear casing cap, respectively. Thus, moreover, a direct fastening to the vehicle will likewise be achieved for this wiper bearing which is exposed to different mechanical strains during the operation of the windshield wiper device.

In an advantageous embodiment, the at least one further wiper bearing is connected to respectively the gear casing or gear casing cap. An oblong carrier provided with a profiled cross-section is used for the connection of this, at least, one further wiper bearing. With each of its opposite ends, this profiled carrier of appropriate length is slipped onto a pivot and fixed thereon in a positive and/or frictional manner. One of these pivots belongs to the at least one further wiper bearing and is preferably manufactured with the same in one piece and the other pivot belongs to the gear casing or gear casing cap, respectively, and is likewise manufactured in one piece with the same. The special advantage of this embodiment consists in that the length of the carrier is freely selectable and in that, in consequence thereof, the otherwise quite compact drive mechanism can easily be adapted to different space conditions of the vehicle. Moreover, such a carrier offers the possibility of carrying out a further adaptation to narrow space conditions of the vehicle by means of several bending operations.

A further advantageous embodiment consists in that the cap of the gear casing is simultaneously designed as a fastening plate for fastening the entire drive mechanism on the vehicle. In this case, there exists the possibility of providing the drive mechanism alternatively with a cap designed as a fastening plate whose shape and arrangement of the fastening lugs are designed in dependence on the installation conditions of the vehicle. In various vehicles, it is easier anyway to fasten such a drive mechanism to the vehicle via the cap of the gear casing and not directly by means of fastening lugs provided on the gear casing. Here, again, the installation conditions of the vehicle, in particular the required position of the output shaft of the driving motor relative to the at least two wiper bearings, play a prominent part.

A further embodiment consists in that, with cost-saving sheet metal technology, the carrier which the at least one further wiper bearing is fastened to is manufactured in one piece together with the gear casing cap made of sheet metal. Here, too, there exists the possibility of varying the length and the shape of the carrier in dependence on the installation conditions of different vehicles. Any corresponding changes can be made either before connecting this wiper bearing to the carrier or directly when performing the connecting operation.

One example of an embodiment will be described in more detail with reference to FIG. 1.

DETAILED DESCRIPTION OF A PREFERRED EMBODIMENT

Figure 1:
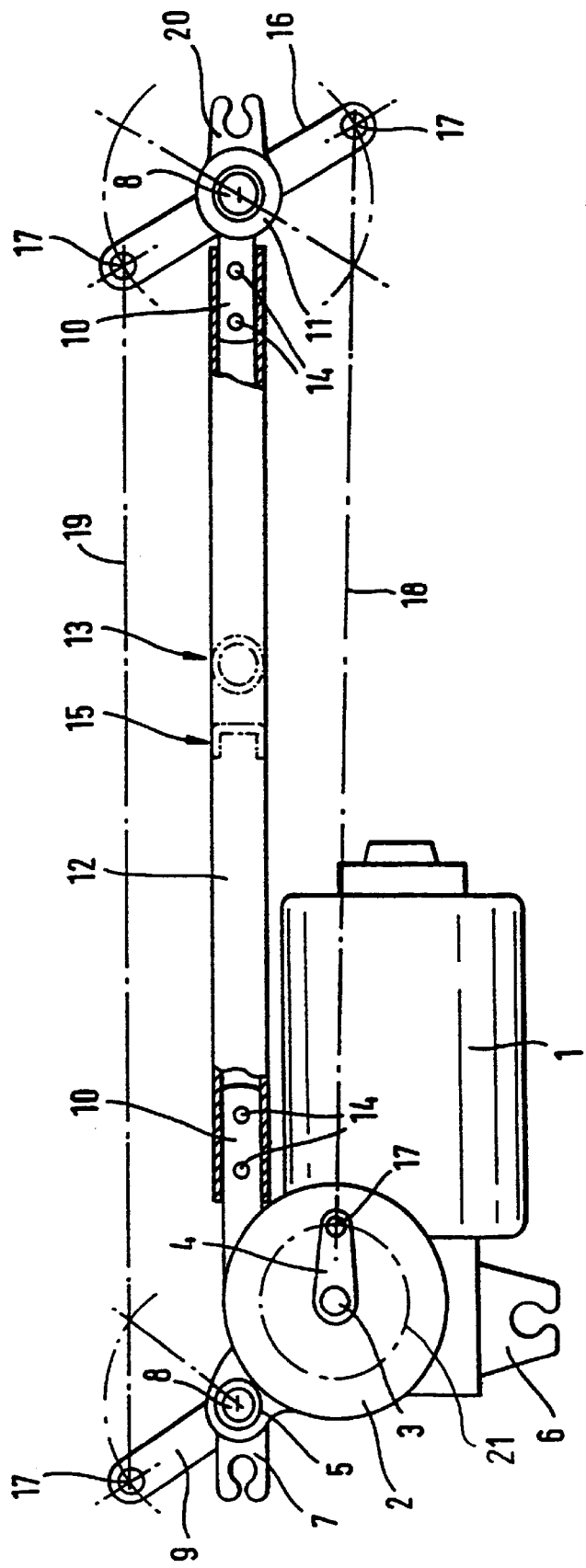
FIG. 1 is a drive mechanism of a windshield wiper device of an automotive vehicle with two windshield wipers.

FIG. 1 illustrates a driving motor 1. Belonging thereto is the gear casing 2 accommodating a gear unit. The gear casing 2 is a metal casting or a plastic molded part and is directly connected with the pot-shaped housing of the driving motor 1. The output shaft 3 of the gear unit is passed with one of its ends outside through a corresponding opening of the gear casing 2. A motor crank 4 is connected in a torsion-resisting manner to this output shaft end 3 passed outside. Arranged on the outside of the gear casing 2 which essentially is shaped like a hollow cylinder is the one wiper bearing 5 which is an integral part of the gear casing 2. The wiper bearing 5 is thus manufactured in one piece with the gear casing 2. Discernible are moreover the fastening lug 6 and the fastening lug 7. The fastening lug 6 is molded directly to the gear casing 2. The other fastening lug 7 is molded to the wiper bearing 5 belonging to the gear casing 2.

The wiper bearing 5 which is part of gear casing 2 is aligned parallel to the output shaft 3 of driving motor 1. The wiper shaft 8 which is connected in a torsion-resisting manner to the bearing crank 9 is supported rotatably in the wiper bearing 5.

A pivot 10 is molded in one piece to the gear casing 2 in an alignment which is approximately parallel to the driving motor 1. The arrangement of the pivot 10 is essentially tangential to the gear casing 2. A second wiper bearing 11 is arranged at a vehicle-predetermined distance from the wiper bearing 5. It is likewise aligned parallel to the output shaft 3 of the driving motor 1 and also has a pivot 10, molded on in one piece. A carrier 12 with a profiled cross-section is destined to connect the second wiper bearing 11 with the gear casing 2 or rather to fasten it to the same. Each of the cross-sectional shapes of the pivots 10 is adapted to the cross-sectional shape of the carrier 12. If the carrier 12 is a tube and thus has a cross-section shaped like a circular ring as demonstrated at point 13 then each of the opposite ends of the carrier 12 is slipped in longitudinal direction onto a pivot 10. So as to achieve a firm connection between the carrier 12 and the pivot 10, e.g., portions of the carrier are pressed into recesses 14 in the pivots 10. It would likewise be possible to provide aligned bores in the pivot 10 and in the carrier 12 instead of the recesses 14 and to bring about the fastening by means of appropriate screwing or riveting.

If the carrier 12 has a U-shaped cross-sectional profile as shown at point 15 the pivots 10 received by the opposite ends of the carrier 12 can be fastened to the carrier 12 in an advantageous manner by means of riveting or screwing. In this case, also, there would be provided appropriate aligned bores, instead of the recesses 14, in the pivots 10 and in the ends of the carrier 12. On the other hand, it would also be possible to provide, on the opposite ends, fastening clips protruding from the side walls of the carrier 12. For fastening the carrier 12 on respectively the pivot 10 of the gear casing 2 and the pivot 10 of the second wiper bearing 11, they will have to be bent into corresponding recesses or clearances on the pivots 10 in order to establish positive fastening.

In the second wiper bearing 11, there is likewise rotatably supported a wiper shaft 8 whereto, again, a wiper lever can be fastened in a manner known per se. A bearing crank 16 designed as a drag link and featuring two diametrically opposite portions relative to the wiper shaft 8 is fastened to the wiper shaft 8 so as to resist torsion. In order to transform the revolving rotary motion of the motor crank 4 into a pendulum-type rotary motion of the wiper shafts 8 there are provided two link rods 18 and 19 which, for the sake of simplicity, are schematically illustrated by dash-dot lines in FIG. 1. Via swivel bearings or rather ball-and-socket joints 17, the link rod 18 is linked to the motor crank 4, on the one hand, and to the one portion of the bearing crank 16 of the second wiper bearing 11, on the other hand. Thus, the wiper shaft 8 of the second wiper bearing 11 is driven via this link rod 18. Via further swivel bearings or ball-and-socket joints 17, the second link rod 19 is linked to the second portion of the bearing crank 16 of the second wiper bearing 11, on the one hand, and to the bearing crank 9 of the first wiper bearing 5 belonging to the gear casing 2, on the other hand. Thus the wiper shaft 8 of the first wiper bearing 5 is secondarily driven by the bearing crank 16 of the second wiper bearing 11.

In FIG. 1, it can further be seen that the second wiper bearing 11 is also integrally equipped with a fastening lug 20 so that, additionally, this second wiper bearing 11 also can be fastened directly to the vehicle.

This invention is not restricted to a drive mechanism with just two wiper bearings. Via a second carrier 12, it would be possible to connect a third wiper bearing with the gear casing 2 or rather the cap 21 thereof in the same manner in order to obtain a drive mechanism with three wiper bearings. To this end, the gear casing 2 or rather the cap 21 thereof would have a second pivot 10 which, e.g., in axial alignment, could be situated exactly opposite the first pivot 10. Then, referring to FIG. 1, it would also be possible to mold this second pivot, instead of the fastening lug 7, to the first wiper bearing 5. However, again in dependence on the installation conditions of the vehicle, it would also be possible to provide the second pivot 10 in another site of the gear casing 2 or of the cap thereof and, while doing so, in another alignment. The wiper shaft of the third wiper bearing then could be driven via a further link rod which, on the one hand, is linked to the bearing crank of the third wiper bearing and, on the other hand, either to the motor crank 4 or to the bearing crank 9 of the first wiper bearing 5. In this case, the ball-and-socket joint 17 on the motor crank 4 or on the bearing crank 9, respectively, could be designed in a manner known per se as a double ball-and-socket joint.

LIST OF REFERENCE NUMERALS gear casing
output shaft
motor crank
wiper bearing
fastening lug
fastening lug
wiper bearing
bearing crank
pivot
wiper bearing
carrier
point
recess
point
bearing crank
ball-and-socket joint
link rod
link rod
fastening lug

What is claimed is:

1. A drive mechanism for at least two windshield wipers with a driving motor comprising a gear unit accommodated in a gear casing, including a cap where an end of an output shaft penetrates a part of the gear casing and protrudes therefrom and is connected in a torsion-resisting manner to a motor crank, and with at least a first and a second wiper bearing in each of which a wiper shaft is supported, the wiper shafts being movable by the motor crank via driving rods so as to perform a pendulum-type rotary motion and each wiper shaft being connectable in a torsion-resisting manner to a windshield wiper, wherein the first wiper bearing is integrated into a portion of the gear casing and wherein at least the second wiper bearing is fastened on a carrier of selectable length which is fastened on a portion of the gear casing, and wherein a pivot is provided on the second wiper bearing and another pivot is provided on a portion of the gear casing and wherein each opposite end of the carrier is slipped onto and is fixed on one of these pivots which have a cross-sectional profile adapted to the carrier.

2. A drive mechanism as claimed in claim 1, wherein the first wiper bearing is integrated on the outside of the gear casing.

3. A drive mechanism as claimed in claim 1, wherein fastening lugs are provided on the portion of the gear casing for fastening the drive mechanism on a vehicle.

4. A drive mechanism as claimed in claim 1, wherein a fastening lug is molded to the first wiper bearing which is integrated into the part of the gear casing.

5. A drive mechanism for at least two windshield wipers with a driving motor comprising a gear unit accommodated in a gear casing, including a cap where an end of an output shaft penetrates a part of the gear casing and protrudes therefrom and is connected in a torsion-resisting manner to a motor crank, and with at least a first and a second wiper bearing in each of which a wiper shaft is supported, the wiper shafts being movable by the motor crank via driving rods so as to perform a pendulum-type rotary motion and each wiper shaft being connectable in a torsion-resisting manner to a windshield wiper, wherein the first wiper bearing is integrated into a portion of the gear casing and wherein at least the second wiper bearing is fastened on a carrier of selectable length which is fastened on a portion of the gear casing, wherein the cap of the gear casing is designed as a fastening plate for fastening the entire drive mechanism on a vehicle.

6. A drive mechanism as claimed in claim 5, wherein the first wiper bearing is integrated on the outside of the gear casing.

7. A drive mechanism as claimed in claim 5, wherein fastening lugs are provided on the portion of the gear casing for fastening the drive mechanism on a vehicle.

8. A drive mechanism as claimed in claim 5, wherein a fastening lug is molded to the first wiper bearing which is integrated into the portion of the gear casing.

9. A drive mechanism for at least two windshield wipers with a driving motor comprising a gear unit accommodated in a gear casing, including a cap where an end of an output shaft penetrates a part of the gear casing and protrudes therefrom and is connected in a torsion-resisting manner to a motor crank, and with at least a first and a second wiper bearing in each of which a wiper shaft is supported, the wiper shafts being movable by the motor crank via driving rods so as to perform a pendulum-type rotary motion and each wiper shaft being connectable in a torsion-resisting manner to a windshield wiper, wherein the first wiper bearing is integrated into a portion of the gear casing and wherein at least the second wiper bearing is fastened on a carrier of selectable length which is fastened on a portion of the gear casing, wherein the cap of the gear casing is designed as a sheet metal carrier so that at least the second wiper bearing can be fastened on this sheet metal carrier.

10. A drive mechanism as claimed in claim 9, wherein the first wiper bearing is intergrated on the outside of the gear casing.

11. A drive mechanism as claimed in claim 9, wherein fastening lugs are provided on the portion of the gear casing for fastening the drive mechanism on a vehicle.

12. A drive mechanism as claimed in claim 9, wherein a fastening lug is molded to the first wiper bearing which is integrated into the portion of the gear casing.

13. In a drive mechanism for at least two windshield wipers of a vehicle with a driving motor including a gear unit accommodated in a gear casing and closed by a cap, one end of an output shaft penetrating one of the gear casing and the cap and connected in a torsion-resisting manner to a motor crank, at least two wiper shafts moveable by the motor crank via driving rods to perform a pendulum-type rotary motion, at least two wiper bearings each supporting one of least two the wiper shaft, each wiper shaft connectible in a torsion-resisting manner to a windshield wiper the improvement comprising:

one wiper bearing of the at least two wiper bearings integrally formed with one of the gear casing and the cap;

a carrier of selectable length fastened to one of the gear casing and the cap;

at least one other wiper bearing of the at least two wiper bearings fastened on the carrier;

the one wiper bearing of the at least two wiper bearings having a first pivot;

one of the gear casing and the cap having a second pivot; and the carrier having opposite ends slipped onto and fixed on the first and second pivots.

14. The improvement of claim 13, further comprising:

the opposite ends of the carrier having cross-sectional profiles; and the first and second pivots having cross-sectional profiles adapted to the cross-sectional profiles of the corresponding ends of carrier.

15. In a drive mechanism for at least two windshield wipers of a vehicle with a driving motor including a gear unit accommodated in a gear casing and closed by a cap, one end of an output shaft penetrating one of the gear casing and the cap, and connected in a torsion-resistant manner to a motor crank, at least two wiper shafts moveable by the motor crank via driving rods to perform a pendulum-type rotary motion, at least two wiper bearings supporting one of the at least two the wiper shaft, each wiper shaft connectible in a torsion-resisting manner to a windshield wiper, the improvement comprising:

one wiper bearing of the at least two wiper bearings integrally formed with one of the gear casing and the cap;

a carrier of selectable length fastened to one of the gear casing and the cap;

at least one other wiper bearing of the at least two wiper bearings fastened on the carrier; and the cap of the gear casing defining a fastening plate for fastening the drive mechanism on the vehicle.

16. In a drive mechanism for at least two windshield wipers of a vehicle with a driving motor including a gear unit accommodated in a gear casing and closed by a cap, one end of an output shaft penetrating one of the gear casing and the cap and connected in a torsion-resisting manner to a motor crank, at least two wiper shafts moveable by the motor crank via driving rods to perform a pendulum-type rotary motion, at least two wiper bearings each supporting one of the at least two the wiper shaft, each the wiper shaft connectible in a torsion-resisting manner to a windshield wiper, the improvement comprising:

one wiper bearing of the at least two wiper bearings integrally formed with one of the gear casing and the cap;

a carrier of selectable length fastened to one of the gear casing and the cap;

at least one other wiper bearing of the at least two wiper bearings fastened on the carrier; and the cap of the gear casing defining a sheet metal carrier for fastening the one wiper bearing of the at least two wiper bearings.

* * * * *